United States Patent
Larsson

(10) Patent No.: US 8,050,311 B2
(45) Date of Patent: Nov. 1, 2011

(54) METHOD AND ARRANGEMENT FOR IMPROVED RELAYING

(75) Inventor: Peter Larsson, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 729 days.

(21) Appl. No.: 12/095,470

(22) PCT Filed: Nov. 29, 2005

(86) PCT No.: PCT/SE2005/001796
§ 371 (c)(1),
(2), (4) Date: May 29, 2008

(87) PCT Pub. No.: WO2007/064252
PCT Pub. Date: Jun. 7, 2007

(65) Prior Publication Data
US 2008/0304555 A1    Dec. 11, 2008

(51) Int. Cl.
*H04B 3/36* (2006.01)
(52) U.S. Cl. ........ 375/211; 342/353; 370/226; 370/243; 370/246; 370/492; 370/501; 375/260

(58) Field of Classification Search ......... None
See application file for complete search history.

(56) References Cited

U.S. PATENT DOCUMENTS

| | | | |
|---|---|---|---|
| 6,889,033 B2 * | 5/2005 | Bongfeldt | 455/11.1 |
| 7,809,047 B2 * | 10/2010 | Kummetz | 375/211 |
| 7,809,072 B2 * | 10/2010 | Oh et al. | 375/267 |
| 2004/0047296 A1 * | 3/2004 | Tzannes et al. | 370/252 |
| 2004/0266339 A1 | 12/2004 | Larsson | |
| 2005/0190822 A1 * | 9/2005 | Fujii et al. | 375/211 |
| 2007/0058577 A1 * | 3/2007 | Rubin | 370/328 |

* cited by examiner

Primary Examiner — David C. Payne
Assistant Examiner — Adolf DSouza

(57) ABSTRACT

A first aspect of the present invention relates to a wireless relaying network having a number of network nodes, including a transmitting node, at least one relaying node and at least one receiving node. Briefly, according to the present invention the transmitting node forms an OFDM-symbol and transmits a signal comprising the OFDM-symbol to the at least one relay node and directly to the receiving node. The relaying node receives, amplifies and transmits the symbol to the receiving node in such manner as to enable the relayed signal and the direct signal to be receive concurrently at the at least one receiving node to enable constructive interference of the OFDM symbol.

16 Claims, 6 Drawing Sheets

METHOD AND ARRANGEMENT FOR IMPROVED RELAYING

TECHNICAL FIELD

The present invention relates to communication systems in general, specifically to methods and arrangements enabling improved relaying in 2-hop communication systems

BACKGROUND

Future wireless and/or cellular systems are expected to either require increased coverage, support higher data rates or a combination of both. In addition, the cost aspect of building and maintaining the system is expected to become of greater importance in the future.

One aspect is rethinking the topology used in existing systems, as there has been little change of topology over the three generations of cellular networks. For instance, it is well known that multihopping, being an example of another communication topology, offers possibilities of significantly reduced path loss between communicating (relay) entities, which may benefit the user. In the following, another type of topology will be discussed that considers two-hop relaying combined with aspects of advanced antenna systems. This is a research area, yet in its infancy, that employs cooperation among multiple stations as a common denominator. In recent research literature, it goes under several names, such as cooperative diversity, cooperative coding, virtual antenna arrays, etc. A good general overview over cooperative communication schemes is given in [1]. The general benefits of cooperation between stations in wireless communication can be summarized as higher data rates, reduced outage (due to some forms of diversity), increased battery life and extended coverage (e.g. for cellular systems).

When routing is applied in a wireless communication network, such a network is often denoted a multihop network. In a multihop network, nodes or stations out of reach from each other can benefit from intermediate located nodes that can forward their messages from the source node towards the destination node. Traditionally, multihop networks have been associated with so called ad hoc networks, where nodes are mostly mobile and no central coordinating infrastructure exists. However, the idea of multihop networking can also be applied when nodes are fixed and/or a central coordinating infrastructure exists. One such scenario targets rural area Internet access and uses fixed nodes attached to the top of house roofs, lamp posts and so forth.

In a multi-hop scenario, information may be transmitted over multiple hops between source and destination instead of directly in a single hop. In general, the multi-hop approach offers several advantages such as lower power consumption and higher information throughput compared to a direct one-hop approach. In a multi-hop network, nodes out of reach from each other can benefit from intermediately located nodes that can forward their messages from the source towards the destination.

One method to provide enhanced coverage and data rate is to use so called 2-hop relaying, which could be viewed as a degenerate case of multihop employing only two hops. The benefit consequently stems from splitting a long transmission distance into two roughly equidistant hops to allow increased data rate on each link as well as the end to end (ETE) total rate.

In one specific form of 2-hop relaying, a transmitter sends a signal to a relay that after receiving the message forwards it to a receiver. At the same time, the signal is sent directly to the receiver. The receiver could then enhance the quality of the signal, by combining the, at two different time instances, received first direct signal and the second relayed signal. Enhanced quality means increased average and less variance of the data rate.

A particular form of 2-hop relaying is often denoted cooperative relaying (CR). (It should be noted that also the previous scheme with only one relay node is sometimes also, although questionably, denoted CR). The basic idea of this particular form of CR is to use various aspects of "cooperation" among relay nodes. For example, a signal sent by a transmitting node may first be received by multiple relays and subsequently and concurrently forwarded and received by a receiving node.

In CR, the relays are generally allowed to perform various signal processing or coding tasks that in various ways improve the overall communication performance. The benefits of the mechanisms that are exploited in CR can broadly be divided into, diversity gain, beam-forming gain, and spatial multiplexing gain. Also, here, the receiver could enhance the quality of the signal by combining the first direct signal and the second relayed signals. An overview of CR schemes is given in [1].

SUMMARY

A general object of the present invention is to provide improved wireless communication networks.

An object of the present invention is to provide methods and arrangements enabling an improved 2-hop relaying scheme.

A specific object is to enable constructive interference between direct and relayed signals in a receiving node.

A further object is to provide predictable and reliable constructive interference between direct and relayed signals.

Yet another specific object is to provide a system utilizing OFDM and on-frequency repeaters to enable constructive interference between direct and relayed signals in a receiving node.

A further object is to provide a method of adapting a cyclic prefix of OFDM symbols to enable constructive interference between direct and relayed signals in a receiving node.

These and other objects are achieved in accordance with the attached patent claims.

A first aspect of the present invention relates to a wireless relaying network having a number of network nodes, including a transmitting node, at least one relaying node and a receiving node. Briefly, according to the present invention the transmitting node forms and transmits an OFDM-symbol to the at least one relay node and directly to the receiving node in such a manner as to enable the relayed signal and the direct signal to reach the receiving node at the same time, or at least close enough in time to enable constructive interference of the OFDM symbol.

More specifically the invention according to one embodiment comprises configuring the cyclic prefix of the OFDM symbol to compensate for the delays induced by multi-path reflections as well as relays' processing delay of the relayed signal, to enable direct and relayed signals to be received concurrently and interfere constructively in the receiving node. The delay characteristic of the total channel, including multipath reflections between the different nodes as well as the processing delay in the relay, can be represented by a so-called power delay profile or power delay function.

Advantages of the present invention include:
Allowing receiving nodes to exploit constructively interfering direct and relayed signals received from the relaying nodes and a transmitting node.
Enhanced SNR.
Support of higher data rates.
A practical solution for a one-communication-phase scheme, i.e. avoiding two communication phases (sometimes denoted as a duplex loss) and hence allows for about a 100% data rate increase.
Transparent from transmitter point of view.
Different CR schemes relying on constructive interference could use the invention.
Enables predictable and reliable constructive interference in the receiving nodes.

BRIEF DESCRIPTION OF THE DRAWINGS

The invention, together with further objects and advantages thereof, will best be understood by reference to the following description taken together with the accompanying drawings, in which.

Figure 1:
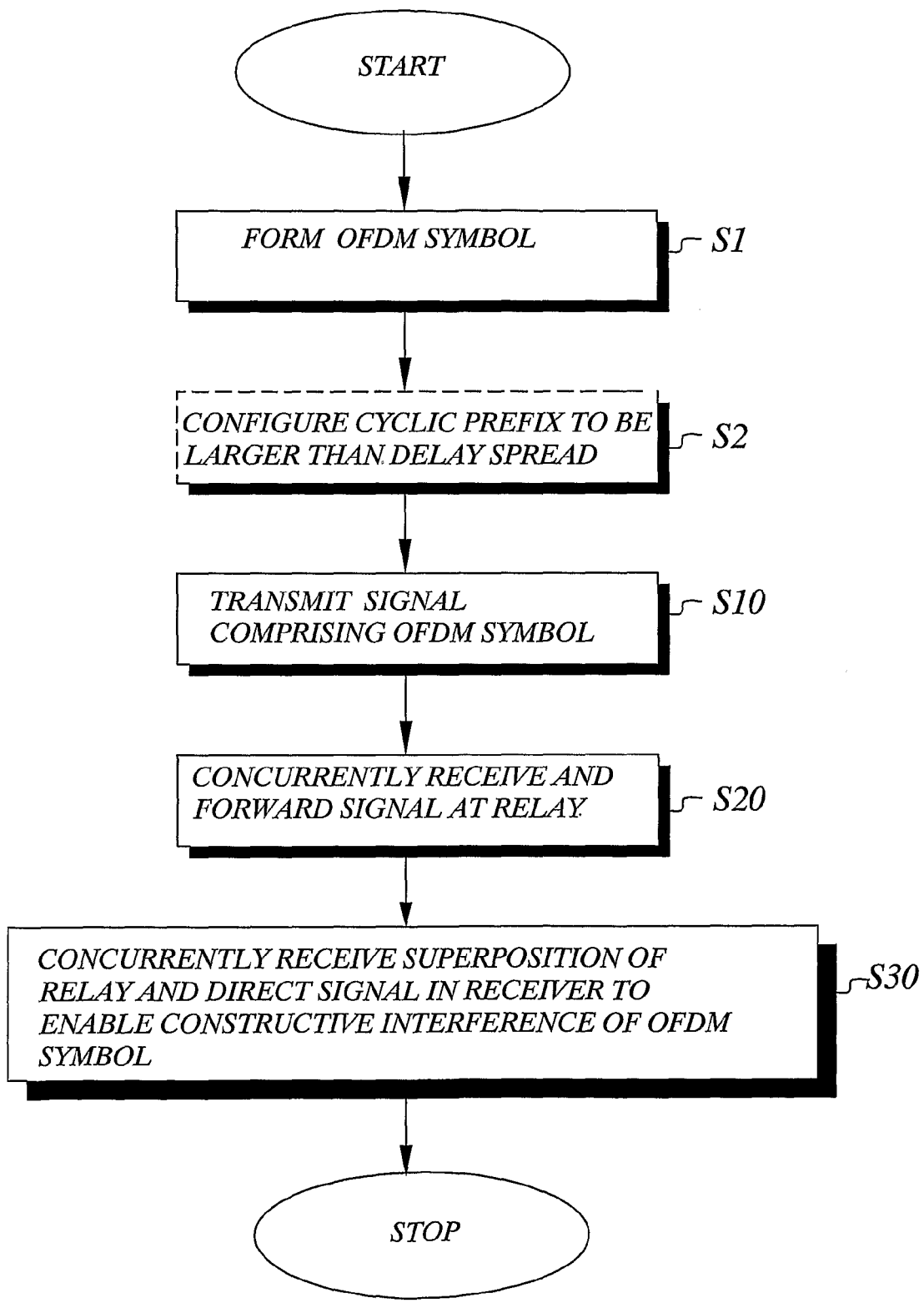
FIG. 1 is a schematic flow diagram of an embodiment of the method according to the invention.

| ABBREVIATIONS | |
| --- | --- |
| CP | Cyclic Prefix |
| CR | Cooperative Relaying |
| CQI | Channel Quality Indication |
| ETE | End To End |
| MIMO | Multiple Input Multiple Output |
| OFDM | Orthogonal Frequency Division Multiplexing |
| OFDMA | Orthogonal Frequency Division Multiple Access |

DETAILED DESCRIPTION

Throughout the drawings, the same reference characters will be used for corresponding or similar elements.

The present invention will be described in the context of a system where all units comprise a single antenna each. However, the invention is equally applicable to systems utilizing multiple antennae per unit, i.e. MIMO systems. This will be described further later.

Existing cooperative relaying schemes suffer from several shortcomings. Among other things, cooperative relaying schemes (CR) typically assume a two-phase scheme, i.e. information is sent to the relays in a first phase and time slot, and then in a second phase and in a second time slot, information is forwarded to the receiver. This two-phase approach reduces the benefits achieved by the relaying itself, since it take two timeslots to transmit the information. In addition, CR may also receive on one frequency and forward information on another frequency. While this does not comprise two-phases per se, the (duplex) loss is similar to the two-phase scheme. Hereafter, whenever two-phases are referred to, this implicitly also refer to receiving on one frequency and forwarding on another.

In many CR schemes, the benefits of exploiting both the relayed signal(s) as well as the direct signal from the transmitter have been recognized. The approach is typically that the direct signal and the relayed signal, being received at two different time instances, are combined in the receiver. Yet, this approach is not necessarily optimal as the two signals will be associated with a respective noise term.

Consequently, as recognized by the inventor, it would be of interest to allow both the direct and relayed signal to be received concurrently i.e. simultaneously or at least approximately at the same time instance, if mechanisms allowing constructive interference could be established. A patent application [2] (and potentially also some papers) exists with hypothetical analysis of relaying system that has assumed (as a side issue) using both the direct and relayed signals. However, this patent application (and the potential papers making the same hypothetical assumption) has not presented a solution on how to achieve this in practice, i.e. when practical constraints as propagation delay, processing delay and delay spread are considered.

Consequently, it would be advantageous to (in a relaying and a cooperative relaying system):
more efficiently use the wireless medium than in the two-phase approach; to better utilize the direct and relayed signals;
and to offer a solution accounting for realistic aspects such as delays, and delay spread.

Accordingly, the basic idea according to the present invention is to provide an amplify- and forward oriented cooperative relaying communication system that allows the direct signal and the relay signal to be received simultaneously or concurrently at a receiver. More precisely, it is desirable that the direct and relayed signal(s) are aligned such that they are given the opportunity to constructively interfere with each other that then can be exploited in the class of CR schemes that relies on constructively interfering signals.

The overall idea of the present invention is achieved through the inventive combined use of so called on-frequency repeaters or relays, and cyclic prefix based OFDM in a 2-hop relaying network or system.

Incorporation of on-frequency repeating relays i.e. can receive and transmit at the same time is known for WCDMA systems but not for OFDM. However, a fairly large relay gain is needed to make this idea useful. Modern on-frequency repeaters can have up to 95 dB gain (Andrews corp.), yet canceling its own transmitted interference through use of signal-processing techniques (apart from separated antennas). The signal processing incurs a delay. Current on-frequency repeater systems, e.g. for WCDMA, does not allow for constructive interference of direct and relayed signal(s) as the symbol (or chip) time is much shorter than relay induced delay differences.

Incorporation of cyclic prefix based OFDM where the cyclic prefix duration is assigned such that it absorbs the latency of the on-frequency repeating relays, the path delay due to the signal route via the relays, as well as the all multi path propagations. Note that by using OFDM itself allows for generation of "long" symbols reducing in relation to the experienced delays and hence reducing the relative impact of delays.

A basic embodiment of a method according to the invention will be described with reference to FIG. 1.

Accordingly, the embodiment comprises initially forming in step S1 an OFDM symbol in the transmitting node and subsequently transmitting in step S10 the signal, the OFDM typically comprises a guard interval or cyclic prefix. The transmitted signal is received in one or more relaying nodes, where the signal is received and simultaneously or concurrently forwarded in step S20 in the same frequency band.

The terms simultaneously or concurrently are used in the sense that the delay or latency introduced in the relayed signal by the relaying node must be substantially smaller than the OFDM symbol duration.

In addition, the relay signal can be amplified in the relaying node before transmission. The transmitted signal is likewise transmitted to the at least one receiving node. Finally, the relayed signal and the direct signal are concurrently received in step S30 in the receiving node in such a manner that the two signals can be constructively superimposed on each other. As a further consequence, the extracted OFDM symbol will be essentially ISI (Inter Symbol Interference) free.

The transmitting node may be, but are not limited to, a base station and the receiving nodes may be, but are not limited to, mobile user terminals. The relaying node may generally be any relaying station provided that it is able to concurrently receive and transmit on the same frequency band. The relay stations in this disclosure are described, but not limited, to be preferable amplify-and-forward stations, it is possible (even if not useful) to utilize decode-forward-stations.

Figure 2:
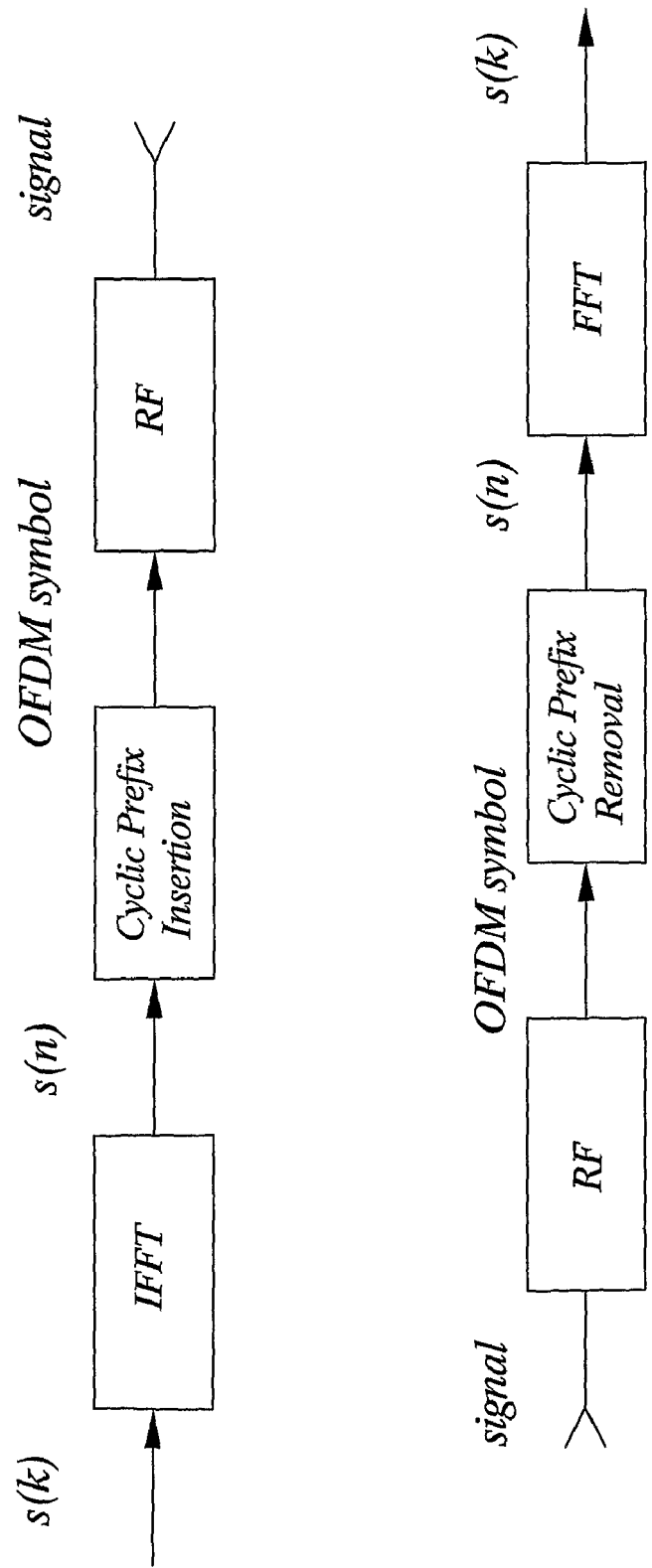
FIG. 2 is a schematic illustration of the forming of an OFDM symbol.

With reference to FIG. 2, the forming of cyclic prefix based OFDM symbols according to known measures normally comprises IFFT (Inverse Fast Fourier Transform) processing, insertion of a guard interval of cyclic prefix and finally transformation of the formed OFDM symbol to a radio frequency signal before transmitting it. Correspondingly, the transmitted signal is received in a receiver, the radio signal is converted into a cyclic prefix based OFDM baseband symbol, the cyclic prefix is removed and the signal is FFT processed to retrieve the actual information.

It should be noted that the constructive interference of the concurrently received signals is only possible if the two signals are in-phase. If the two signals are of opposite phase, the concurrent reception will result in canceling out of the OFDM-symbol. Therefore, the present invention supplies the necessary tools for enabling but not necessarily guaranteeing constructive interference. However, an additional optional step would be to compare the phase of the relayed signal and the direct signal and phase shifting one of them in the relay node, if necessary, thereby ensuring constructive interference. A possibility would also, in addition or alternatively to the phase adaptation above, be to set or adaptively adjust the gain in the relay. Yet, the parameter may also be entirely fixed.

An important feature of the present invention is that it enables simultaneous or simultaneous enough reception of direct and relayed signals for the same OFDM symbol, thus enabling constructive interference.

In order to further enable the constructive interference of direct and relayed signals of the same OFDM symbol, it is useful to configure the cyclic prefix in an appropriate manner. According to one embodiment of the method of the present invention, the step of forming the OFDM symbol comprises a further step of configuring in step S2 the cyclic prefix to be larger than the a measure of duration of the power delay profile of the channel formed by the direct and relayed signals. The measure of duration relates to for example, the maximum excess delay of the power delay profile e.g. a constant times the maximum excess delay. A definition of the maximum excess delay (XdB) is the time delay or latency during which the multipath energy falls to X dB below the maximum.

For example, the duration of the power delay profile may be represented by a parameter that describes the duration of the part of the power delay profile which has a power exceeding a predetermined value.

Yet a further embodiment comprises the step of canceling the feedback from transmitted signal at the receiver input of one or more of the relaying nodes, through interference cancellation which provides increased amplification gain in the relaying nodes.

As stated earlier, the present invention enables direct and relayed signals for the same OFDM symbol to reach a receiving node more or less simultaneously. However, since the two signals can be phase shifted with respect to each other there is no guarantee for constructive interference. A further embodiment for ensuring concurrency both in time and in phase is to provide detection and correction of any phase difference between the direct and relayed signals.

The invention will be described with reference to the basic system of FIG. 3. The system comprises a transmitting node TX, a plurality of relaying nodes $RS_1 \ldots RS_V$ and at least one receiving node $RX_1$. The transmitting node typically is a radio base station or a mobile station in an OFDM or OFDMA system. Even if the system is visualized with one antenna per unit (transmitter, relay, receiver), the same general principles are applicable for multi antenna units, which will be described later on in this disclosure.

Figure 3:
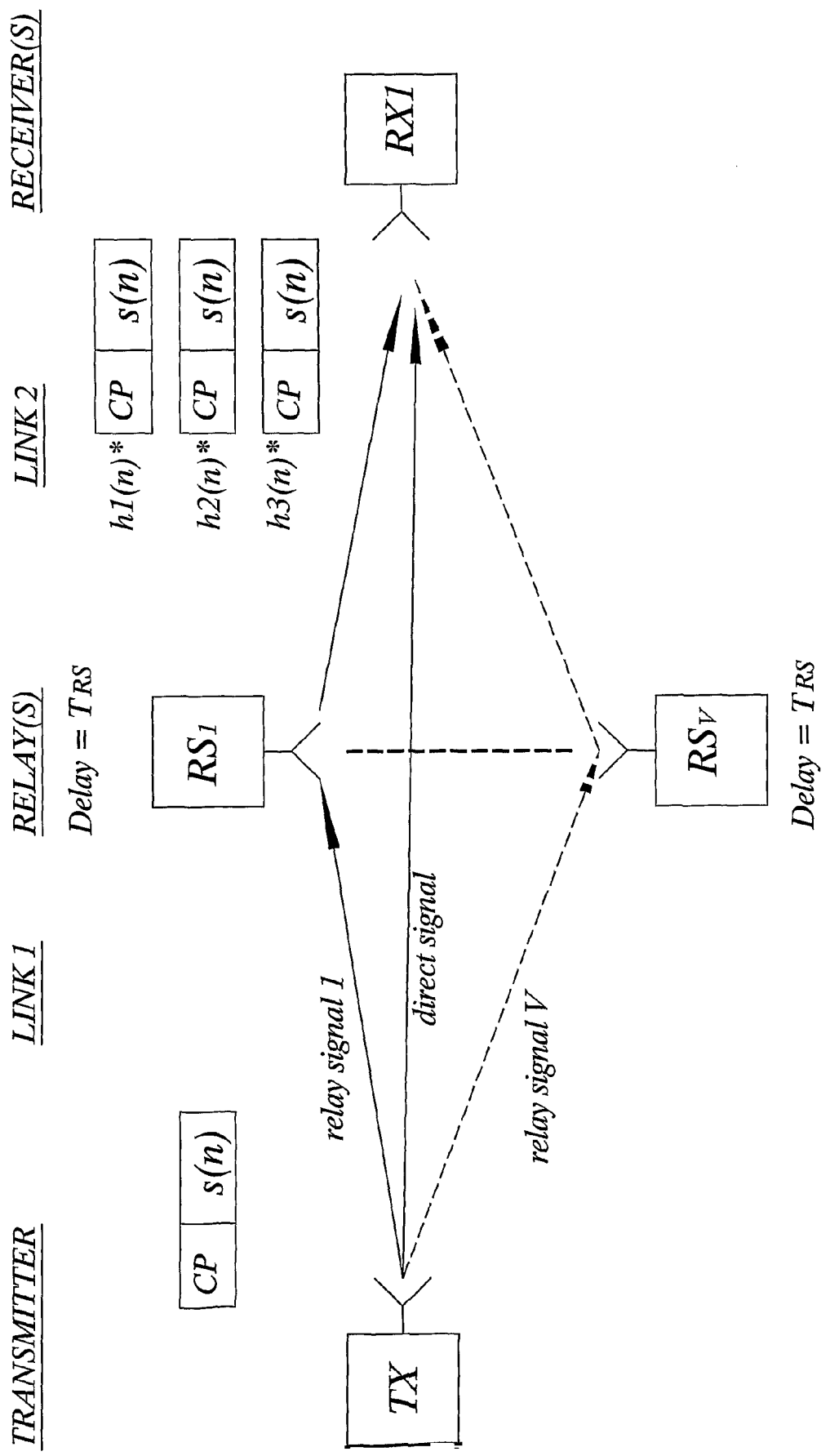
FIG. 3 is a schematic illustration of an exemplary embodiment of a method of improved relaying according to the invention.

FIG. 3 shows the cooperative relaying architecture for a system comprising one transmitter node, one receiver node and V relay nodes. According to the invention, the relay nodes comprise at least one on-frequency repeater. At least one of the V on-frequency repeaters receives the signal and transmits it immediately on the same frequency while receiving, yet imposing a delay $T_{RS}$. The delay may be due to filtering, amplification and due to self-interference cancellation, i.e. canceling its own amplified signal from its received signal of interest. The cyclic prefix (CP) duration is set roughly to $T_{CP} > T_{RS} + T_{DS} + T_P$, where $T_{DS}$ is the maximum delay spread per path, $T_P$ is the maximum path delay differences between the relay path(s) and the direct path. This setting of the CP duration in conjunction with use of OFDM ensures that OFDM symbols received by any receiver within desired coverage area can extract an (for all practical proposes) ISI-free (i.e. ISI with respect to preceding or next OFDM symbols) representation of the OFDM signal. It is noted that the OFDM symbols traversing the different paths, i.e. the direct and relay path, are received concurrently with (sufficiently large) overlapping portions corresponding to the same OFDM symbol.

Figure 4:
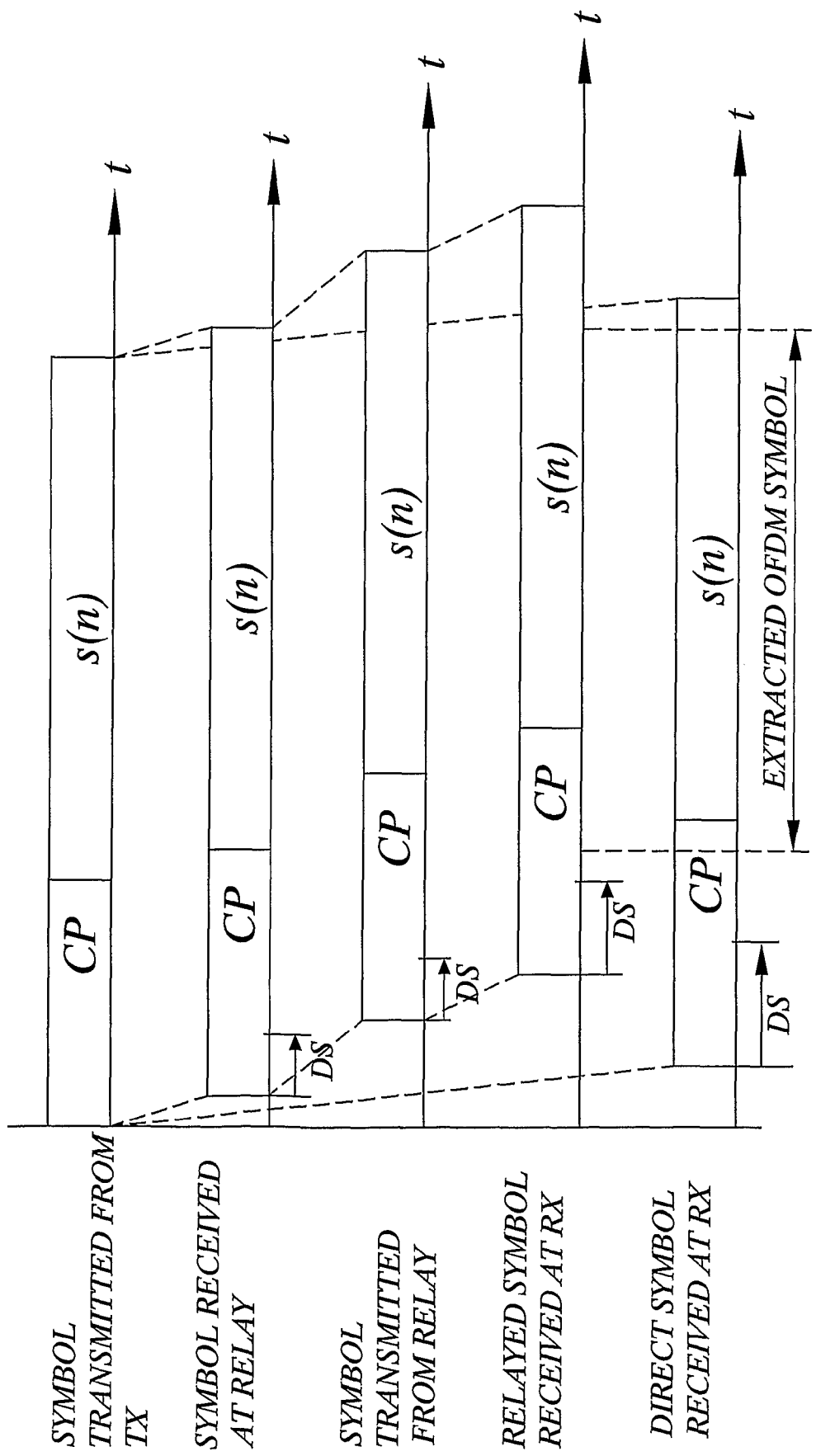
FIG. 4 is an illustration of handling of delay according the invention.

A timing diagram for one OFDM symbol is shown in FIG. 4. The delay for: transmitter to relay node receiving, relay node transmitting, receiver receiving from the relay node, and the receiver receiving directly from the transmitter is illustrated. Also, the delay spread is schematically illustrated.

Given the design above, the signal for sub carrier k received by the receiving node is then $$R(k) = H^{(0)}(k) \cdot S(k) + \sum_{v=1}^{V} H_v^{(2)}(k) \cdot a_v(k) \cdot (H_v^{(1)}(k) \cdot S(k) + W_v(k)) + W(k) \quad (1)$$

-continued or $$R(k) = S(k) \cdot H^{(eff)}(k) + W^{(eff)}(k) \quad (1a)$$

with $$H^{(eff)}(k) = H^{(0)}(k) + \sum_{v=1}^{V} H_v^{(2)}(k) \cdot a_v(k) \cdot H_v^{(1)}(k) \quad (1b)$$

$$W^{(eff)}(k) = \sum_{v=1}^{V} H_v^{(2)}(k) \cdot a_v(k) \cdot W_v(k) + W(k) \quad (1c)$$

where H(k) is the complex channel gain, S(k) is the complex data symbol, W(k) is the complex valued noise, α(k) is a amplitude gain factor of a relay (could also be complex), and (0), (1), (2) denote the direct link, the transmitter to relay link, and the relay to receiver link respectively.

It can be noted that ISI adjacent OFDM symbols is not involved and does not need to be included in the model above. In this disclosure, the term Inter Symbol Interference refers to interference between adjacent OFDM symbols.

Figure 5:
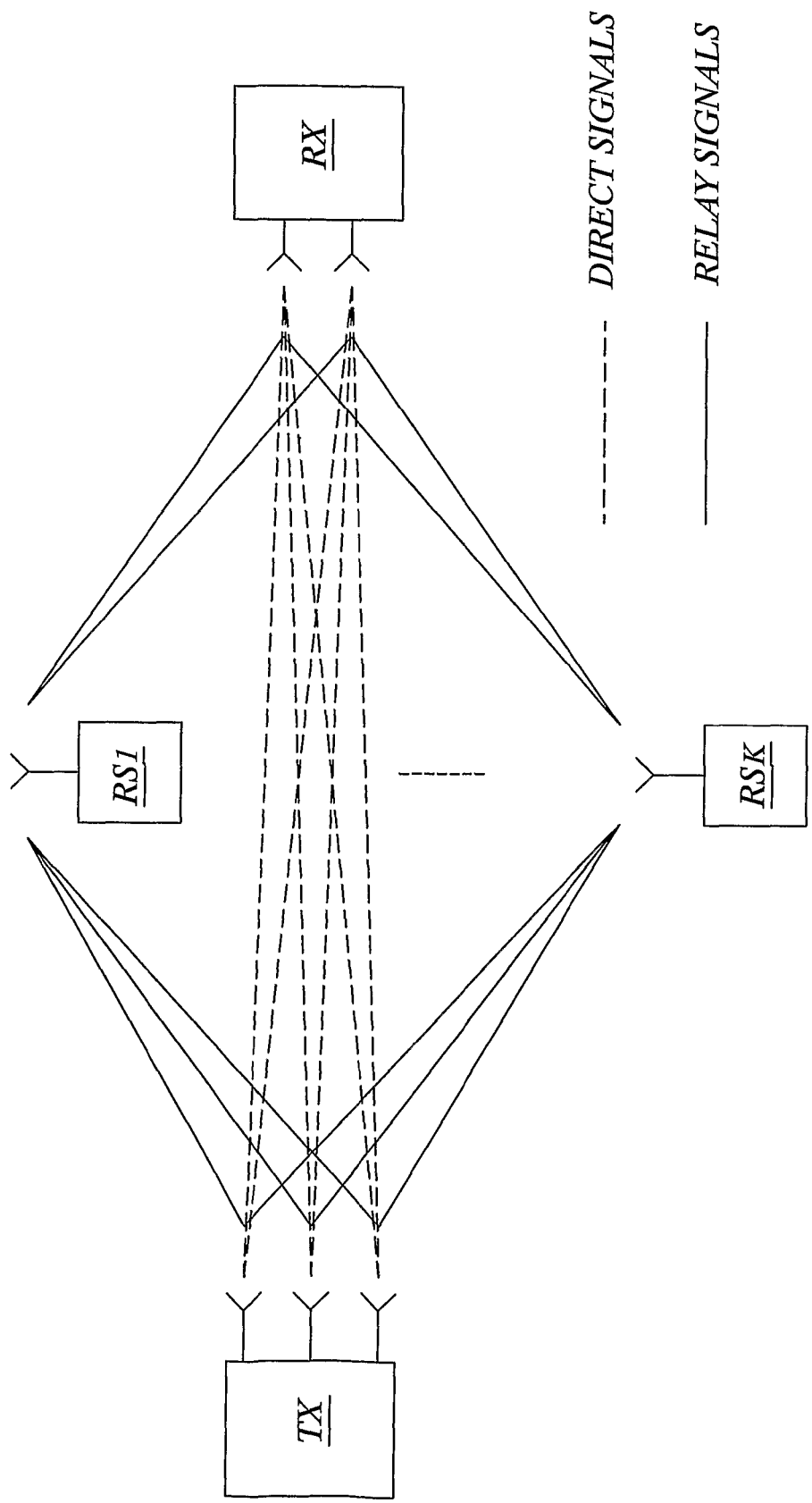
FIG. 5 is a schematic illustration of direct and relayed signals in a MIMO system.

As mentioned previously, and with reference to FIG. 5, the architecture of the invention is transparent to whether MIMO or any other advanced antenna technique is used between the transmitting node and the receiving node or nodes. FIG. 5 illustrates such a MIMO system, wherein a transmitting node TX with three antennas communicates with a receiving node RX with two antennas via a plurality of relaying nodes $RS_1 \ldots RS_K$. It should be noted that the specific number of antennas can be varied and that also the relying nodes can have multiple antennas.

One reason for utilizing the combination of the core invention and MIMO based communication is that, without relays, the number of multipath reflections between the transmitter and receiver typically limits the richness of the MIMO channel, which has certain drawbacks. More precisely, when analyzing the MIMO channel (not using relays), it is often noted that the number of MIMO sub-channels with a substantial channel gain (i.e. the singular values square of the channel matrix between the sender and the receiver) is limited, not by the number of antennas at the sender or the receiver side, but rather by the number of dominating multipath signals. For spatial multiplexing based MIMO, which offers high data rates, it is vital that not the radio channel, but rather the number of antennas sets the limit of the data rate. Hence, by introducing relays, enhanced data rate through improved MIMO channel matrix characteristics is enabled.

The latter is achieved in that:
i) A greater number of singular values will be present (through a "rank deficiency mitigation" by the presence of many relays),
ii) An improved more even distribution of singular values will result.
iii) An improved strength of the singular values will be experienced (Since the relays breaking the propagation path in two steps and possibility to mitigate diffraction path loss)

An additional optional step would be to set or adaptively adjust the phase(s) and gain(s) parameters of the MIMO signal(s) received and forwarded by the relay. The phase and gain parameter(s) could be set on fast basis to follow instantaneous channel variations or more slow changes of the channel. The parameter may also be entirely fixed.

Figure 6:
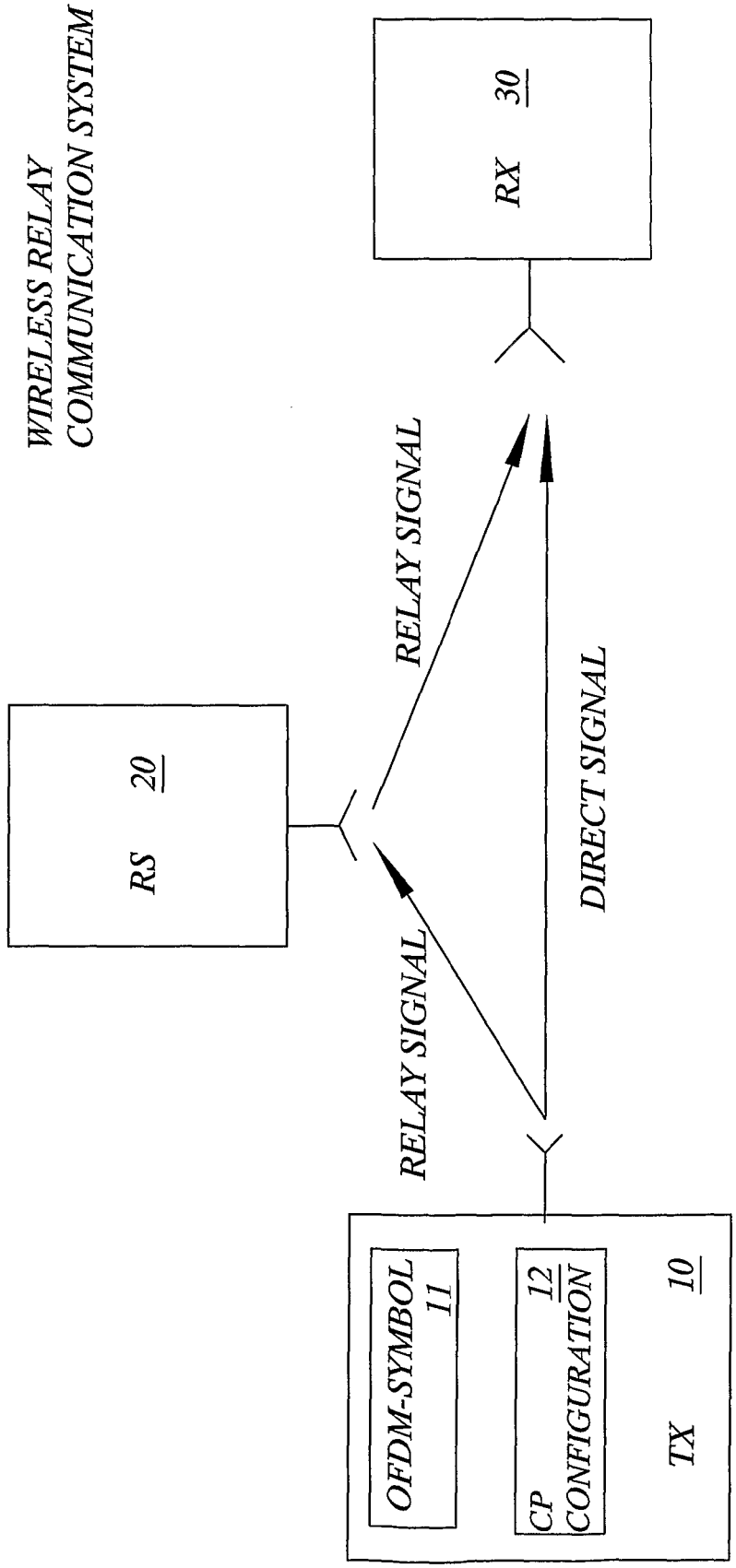
FIG. 6 is a schematic diagram of a wireless relay system according to the invention.

FIG. 6 is a schematic diagram of a wireless relay communication system 1 according to en exemplary embodiment of the present invention. The system basically comprises a transmitting node (TX) 10 (e.g. base station), a plurality of relay nodes (RS) 20 (e.g. on-frequency repeaters), and at least one receiving node (RX) 30 (e.g. mobile user station). The transmitting node (TX) 10 comprises an OFDM unit 11 for forming OFDM symbols, and a cyclic prefix unit 12 for configuring the cyclic prefix of the formed OFDM symbols, in addition to the normal transceiver functionality. The relay nodes (RS) 20 may be any conventional relay station, capable of on-frequency repeater functionality.

The transmitting node 10 forms an OFDM symbol and transmits a signal comprising the OFDM symbol directly to the receiving node 30 and as a relayed signal to the relaying node. Further, the transmitting node 10 can further be adapted to configure a cyclic prefix for the OFDM symbol that is larger than the delay introduced by the relay node and multipath signals (that have significant power) for the propagation between the base to mobile station, base to relay station and relay to mobile station. The delay is represented by some predetermined parameter value that is dependent of duration of the power delay profile of the equivalent channel of said relayed signal and said direct signal. Further, the transmitting node 10 may configure the cyclic prefix of the OFDM symbol to be larger than a predetermined parameter based on the power delay profile of the equivalent channel of said relayed signal and said direct signal. The relay nodes 20 concurrently, and with latency substantially smaller than the OFDM symbol duration, receives and amplifies a representation of said signal, and forwards the amplified representation as a relayed signal in the same frequency band to the receiving node 30. Finally, the receiving node 30 concurrently receives the direct and relayed signals.

According to another embodiment, the system is configured for detecting any phase difference between the direct and the relayed signals and for phase shifting at least one of the signals to ensure constructive interference for the same OFDM symbol.

In summary the methods and arrangements of the present invention comprise combining on-frequency repeaters with OFDM (being assigned a sufficiently long cyclic prefix). This combination enables ISI free and constructive interference of signals received both from the RS and the BS. It is also advantageous to use the property of enabling constructively interfering signals with a (CR) communication scheme relying on the need of constructive interference.

The present invention is especially useful in different types of cooperative relaying schemes relying on constructive interference (such as coherent combining based cooperative relaying as disclosed in [2].

Advantages of the present invention include:
Allowing receiving nodes to exploit constructively interfering direct and relayed signals received from the relaying nodes and a transmitting node.
Enhanced SNR.
Support of higher data rates.
A practical solution for a one-phase scheme, i.e. avoiding two phases and hence allows for about a 100% data rate increase.
Transparent from transmitter point of view.
Different CR schemes relying on constructive interference could use invention.
Enables predictable and reliable constructive interference in the receiving nodes.

It will be understood by those skilled in the art that the embodiments described above are merely given as examples, ant it should be understood that the present invention is not limited thereto. Further modifications, changes and improvements that retain the basic underlying principles disclosed and claimed herein are within the scope of the invention.

REFERENCES

[1] J. N. Laneman, *Cooperative Diversity in Wireless Networks: Algorithms and Architectures*, Ph.D. Thesis, Massachusetts Institute of Technology, Cambridge, Mass., August 2002. <Thesis>
[2] U.S. Patent Application No. US 2004/0266339 A1, Peter Larsson, Dec. 30, 2004.

The invention claimed is:

1. A method for communication in a wireless communication relay system having a number of network nodes, said system comprising a transmitting node, at least one relaying node, and at least one receiving node, each node with at least one antenna, wherein said method comprises the steps of:
said transmitting node forming at least one OFDM symbol; and
said transmitting node transmitting a signal comprising said at least one OFDM symbol to the at least one relaying node and directly to the at least one receiving node,
said transmitting node configuring a cyclic prefix for said OFDM symbol, wherein the time duration of said cyclic prefix is larger than a predetermined parameter based on a power delay profile of an equivalent channel of said relayed signal and said direct signal, and wherein said parameter is based on at least one or a combination of a maximum delay spread for each said relayed and direct signal, a maximum delay difference between said relayed and direct signals, and a relay node induced delay said at least one relaying node concurrently, and with a latency substantially smaller than the OFDM symbol duration, receiving and amplifying a representation of said signal, and transmitting said amplified representation as a relayed signal in the same frequency band, and
said at least one receiving node concurrently receiving a superposition of said direct signal and said relayed signal to enable constructive interference for corresponding said at least one OFDM symbol and providing the extracted OFDM symbol substantially free from Inter Symbol Interference.

2. The method according to claim 1, wherein said predetermined parameter is equal to the sum of the maximum delay spread for each said relayed and direct signal, the maximum delay difference between said relayed and direct signals, and the relay node induced delay.

3. The method according to claim 1, wherein said wireless communication system is a cooperative relaying system.

4. The method according to claim 3, wherein said cooperative relaying system is a two-hop system.

5. The method according to claim 1, wherein said at least one relay node comprises at least one on-frequency repeater.

6. The method according to claim 1, further comprising canceling, in a subset of the at least one relaying node, the feedback experienced from the transmitted signal at a receiver input of said at least one relay node, through interference cancellation, to enable increased amplification gain in said subset of relay nodes.

7. The method according to claim 1, wherein said at least one receiving node has a single antenna and said transmitting node has at least one antenna, said method further comprising detecting a phase difference between the relayed signal and the direct signal, and phase shifting said relayed signal based on the detected phase difference, ensuring said signals to be received concurrently and substantially in-phase at said at least one receiving node.

8. The method according to claim 1, wherein each of said transmitter node and said at least one receiving node comprise multiple antennas and said transmitter node and said at least one receiving node communicating by means of a MIMO communication method, further comprising adapting at least one of the gain and the phase parameters for the forwarded signal in at least one relaying node depending on at least one of the channels between transmitting node-receiving node, transmitting node-relaying node, and relaying node-receiving node.

9. A wireless communication relay system having a number of network nodes, said system comprising a transmitting node, at least one relaying node, and at least one receiving node, each node with at least one antenna, wherein said system comprises:
means, in said transmitting node, for forming at least one OFDM symbol to said at least one relaying node and directly to said at least one receiving node, and
means, in said transmitting node, for transmitting a signal comprising said at least one OFDM symbol to the at least one relaying node and directly to the at least one receiving node,
means for configuring a cyclic prefix for said OFDM symbol, wherein the time duration of said cyclic prefix is larger than a predetermined parameter based on a power delay profile of an equivalent channel of said relayed signal and said direct signal, and wherein said parameter is based on at least one or a maximum delay spread for each said relayed and direct signal, a maximum delay difference between said relayed and direct signals, and a relay node induced delay
means, in said at least one relaying node, for concurrently, and with a latency substantially smaller than the OFDM symbol duration, receiving and amplifying a representation of said signal, and
means in said at least one relaying node, for transmitting said amplified representation as a relayed signal in the same frequency band, and
means, in said at least one receiving node, for concurrently receiving a superposition of said direct signal and said relayed signal to enable constructive interference for corresponding said at least one OFDM symbol and providing the extracted OFDM symbol substantially free from Inter Symbol Interference.

10. The system according to claim 9, wherein said predetermined parameter is equal to the sum of the maximum delay spread for each said relayed and direct signal, the maximum delay difference between said relayed and direct signals, and the relay node induced delay.

11. The system according to claim 9, wherein said wireless communication system is a cooperative relaying system.

12. The system according to claim 11, wherein said cooperative relaying system is a two-hop system.

13. The system according to claim 9, wherein said at least one relay node comprises at least one on-frequency repeater.

14. The system according to claim 9, wherein a subset of the at least one relaying node is configured to cancel the feedback experienced from the transmitted signal at the receiver input of said relaying node through interference cancellation, to enable increased amplification gain in said one or a subset of nodes.

15. The system according to claim 11 wherein said at least one receiving node has a single antenna and said transmitting node has at least one antenna, further comprising means for detecting a phase difference between the relayed signal and the direct signal, and means for phase shifting said relayed signal based on the detected phase difference, ensuring said signals to be received concurrently and substantially in-phase at the receiving node.

16. The system according to claim 11 wherein each of said transmitter node and said at least one receiving node comprise multiple antennas and said transmitter node and said at least one receiving node communicating by means of a MIMO communication method, further comprising means for adapting at least one of the gain and the phase parameters for the forwarded signal in at least one relaying node depending on at least one of the channels between transmitting node-receiving node, transmitting node-relaying node and relaying node-receiving node.

* * * * *